US011035416B2

(12) United States Patent
Wehner

(10) Patent No.: US 11,035,416 B2
(45) Date of Patent: Jun. 15, 2021

(54) PROPELLER SHAFT TUBE YOKE HAVING A WELDED JOINT

(71) Applicant: NEAPCO INTELLECTUAL PROPERTY HOLDINGS, LLC, Farmington Hills, MI (US)

(72) Inventor: Robert J. Wehner, Livonia, MI (US)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 386 days.

(21) Appl. No.: 16/154,318

(22) Filed: Oct. 8, 2018

(65) Prior Publication Data

US 2019/0113083 A1    Apr. 18, 2019

Related U.S. Application Data

(60) Provisional application No. 62/572,741, filed on Oct. 16, 2017.

(51) Int. Cl.
| | |
|---|---|
| F16D 3/38 | (2006.01) |
| F16C 3/02 | (2006.01) |
| F16C 33/78 | (2006.01) |
| F16D 3/41 | (2006.01) |
| F16D 1/068 | (2006.01) |

(52) U.S. Cl.
CPC .............. *F16D 3/387* (2013.01); *F16C 3/023* (2013.01); *F16C 33/7809* (2013.01); *F16D 1/068* (2013.01); *F16D 3/41* (2013.01); *F16C 2326/06* (2013.01); *F16C 2361/41* (2013.01); *Y10T 403/478* (2015.01); *Y10T 464/40* (2015.01)

(58) Field of Classification Search
CPC . F16D 3/387; F16D 3/41; F16D 1/068; F16D 2250/0076; F16C 3/023; F16C 33/7809; F16C 2326/06; F16C 2361/41; Y10T 464/40
USPC ................................................... 464/127, 182
See application file for complete search history.

(56) References Cited

U.S. PATENT DOCUMENTS

| | | | | |
|---|---|---|---|---|
| 699,180 | A | * | 5/1902 | Jetter ............................ 464/134 |
| 1,354,912 | A | * | 10/1920 | Lockton .................. F16D 3/38 464/134 |
| 3,369,378 | A | * | 2/1968 | Miller, Jr. ............... F16D 3/382 464/130 |
| 5,637,042 | A | | 6/1997 | Breese |
| 5,716,277 | A | | 2/1998 | Reynolds |
| 6,319,134 | B1 | * | 11/2001 | Menosky ............... B60K 17/22 464/183 |

(Continued)

*Primary Examiner* — Greg Binda
(74) *Attorney, Agent, or Firm* — Shumaker, Loop & Kendrick, LLP

(57) ABSTRACT

A tube yoke end fitting for coupling to a shaft tube of a drive shaft assembly includes a tubular first portion having a first end and a second end. The first end configured for coupling to the shaft tube. The tube yoke end fitting includes a second portion including a pair of ears extending outwardly from the second end of the first portion. The pair of ears is diametrically spaced from each other with respect to the first portion. Each of the pair of ears includes an aperture formed therethrough. A yoke length of the tube yoke end fitting measured from a center of each of the apertures to the first end of the first portion is greater than an ear span of the tube yoke end fitting measured between outer surfaces of the pair of ears.

11 Claims, 2 Drawing Sheets

(56) References Cited

U.S. PATENT DOCUMENTS

| 6,773,354 B2* | 8/2004 | Marriott | F16C 3/023 |
| | | | 464/127 |
| 2003/0125118 A1* | 7/2003 | Raghavan | F16C 3/023 |
| 2005/0003897 A1* | 1/2005 | Wagner | B21C 37/16 |
| | | | 464/136 |

* cited by examiner

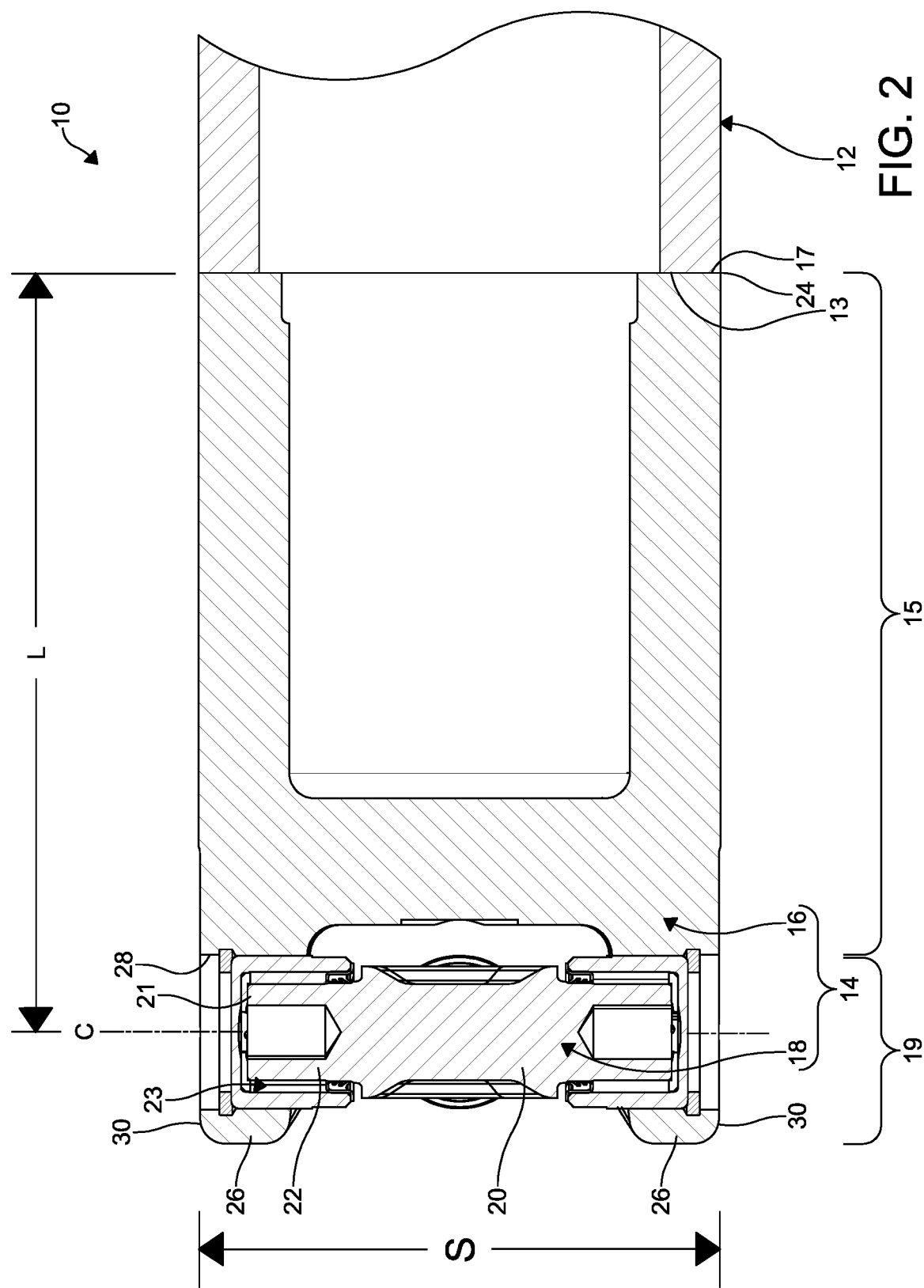

PROPELLER SHAFT TUBE YOKE HAVING A WELDED JOINT

CROSS-REFERENCE TO RELATED APPLICATION

This patent application claims the benefit of U.S. Provisional Patent Application No. 62/572,741, filed on Oct. 16, 2017. The entire disclosure of the above patent application is hereby incorporated herein by reference.

FIELD

The present invention relates to propeller shaft assemblies for transferring torque in a vehicle and more particularly to a drive shaft and a universal joint assembly.

BACKGROUND OF THE INVENTION

As is commonly known, propeller shaft assemblies or drive shaft assemblies are components in automotive vehicles for applications requiring a transmission of torque. In many applications, the shaft assemblies include a substantially cylindrical shaft tube joined to a substantially cylindrical end fitting such as a cardan joint yoke, commonly called a tube yoke, which is used for attachment of a cardan joint. The tube shaft and the tube yoke are typically formed from a metal. The end fitting or tube yoke is received in the shaft tube and welded to the shaft tube by a butt weld, for example. In other embodiments, an end of the tube yoke abuts an end of the shaft tube without being received in the shaft tube. A distal end of the tube yoke includes a pair of ears or lugs to receive arms or trunnions of the joint. An example of a shaft tube and tube yoke end fitting is shown and described in U.S. Pat. No. 5,637,042, the disclosure of which is hereby incorporated herein by reference in its entirety.

In prior art shaft assemblies, a ratio of a yoke length of the tube yoke to a ear span of the tube yoke is less than 1.1. For example, the yoke length of the tube yoke is about 96 millimeters in certain prior art shaft assemblies. The ear span of the tube yoke is typically 136.7 inches in certain prior art shaft assemblies. The result is a ratio of approximately 0.70 which is less than 1.1.

It is widely known that long-term application of cyclic torsional loads to the shaft tubes may result in eventual metal fatigue fractures. Due to heat softening and geometric stress concentrations that often occur with the welding of the tube yoke to the shaft tube, the fatigue fractures commonly originate within or adjacent the weld, including butt welds between the shaft tube and the tube yoke. Additionally, the fatigue fractures occasionally originate within or adjacent welds that secure balance weights to the shaft tube.

It has been commonly accepted that torsional loading through cylindrical cross-sections generally produces a shear stress loading condition. However, it has also been determined through testing and simulations that tube yokes, as configured for cardan joints, impart tensile stresses into a cylindrical portion of the tube yokes, the shaft tube, and the weld that joins the tube yoke and the shaft tube together. Such tensile stresses are imparted as a result of bending forces applied through the ears or lugs of the tube yoke during application of torque through the joint. The resulting tensile stresses, when combined with the expected shear stresses from torsional loading, have been shown to significantly reduce the expected fatigue life of the shaft tube. The fatigue life is especially reduced when the tensile stresses are elevated within or near the weld joining the shaft tube to the tube yoke or the welds coupling the balance weights to the shaft tube.

It has become evident through design simulations, the tensile stresses imparted by tube yokes are generally higher in close proximity to a base of the ears or lugs, and the tensile stresses tend to dissipate or level off with increasing distance from the base of the ears or lugs. Within the shaft tube, the tensile stresses tend to be highest adjacent the end of the shaft tube where the shaft tube is welded to the tube yoke. With increasing distance from the end of the shaft tube, the stress decreases until a nearly homogeneous shear stress state is present within the shaft tube. However, because the ratio of the yoke length of the tube yoke to the ear span is less than 1.1 in known shaft assemblies, the tensile stresses throughout the length of the tube yoke are higher than desired for optimal fatigue life. Furthermore, the minimized yoke length of known tube yokes does not facilitate attachment of large balance weights or multiple balance weights thereto. Typically, the balance weights are coupled to the shaft tube because of the minimized length of the tube yokes. Certain welding methods, including friction welding or magnetically impelled arc butt (MIAB) welding may cause displacement of material at an end seating surface or interface of the tube yoke to the shaft tube during the welding operation. In such cases, the yoke length of the tube yoke is determined prior to welding.

Accordingly, it is desired to include a tube yoke for coupling to a shaft tube that minimizes stresses and fatigue fractures around joint interfaces between the shaft tube and tube yoke and maximizes reliability while facilitating attachment of balance weights in a cylindrical portion of the tube yoke.

SUMMARY OF THE INVENTION

In accordance and attuned with the present invention, a tube yoke end fitting for coupling to a shaft tube that minimizes stresses and fatigue fractures around joint interfaces between the shaft tube and end fitting and maximizes reliability while facilitating attachment of balance weights in a cylindrical portion of the end fitting has surprisingly been discovered.

According to an embodiment of the invention, a tube yoke end fitting for coupling to a shaft tube of a drive shaft assembly is disclosed. The tube yoke end fitting includes a tubular first portion having a first end and a second end. The first end is configured for coupling to the shaft tube. A second portion includes a pair of ears extending outwardly from the second end of the first portion. The pair of ears are diametrically spaced from each other with respect to the first portion. Each of the pair of ears include an aperture formed therethrough, wherein a yoke length of the tube yoke end fitting measured from a center of each of the apertures to the first end of the first portion is greater than an ear span of the tube yoke end fitting measured between outer surfaces of the pair of ears.

According to another embodiment of the invention, a drive assembly includes a tubular shaft tube and a tube yoke end fitting coupled to the shaft tube at an interface. The tube yoke end fitting includes a tubular first portion and a second portion. The first portion has a first end coupled to the tubular shaft. The second portion has a pair of ears extending outwardly from a second end of the first portion. Each of the pair of ears includes an aperture formed therethrough, wherein a yoke length of the tube yoke end fitting measured from a center of each of the apertures to the interface is greater than an ear span of the tube yoke end fitting measured between outer surfaces of the pair of ears.

According to yet another embodiment of the disclosure, a drive shaft assembly includes a shaft tube having an end seating surface. A tube yoke end fitting is coupled to the shaft tube at an interface and includes a tubular first portion and a second portion. A first end of the first portion has an end seating surface abutting the end seating surface of the shaft tube. A second end of the first portion has a pair of ears extending outwardly therefrom. Each of the pair of ears has an aperture formed therethrough. A yoke length of the tube yoke end fitting measured from a center of the apertures to the interface is greater than an ear span of the tube yoke end fitting measured between outer surfaces of the pair of ears The tube yoke end fitting has an outer diameter substantially equal to an outer diameter of the shaft tube. A balance weight is coupled to the first portion of the tube yoke end fitting.

BRIEF DESCRIPTION OF THE DRAWINGS

The above advantages of the invention will become readily apparent to those skilled in the art from reading the following detailed description of an embodiment of the invention in the light of the accompanying drawings which:

FIG. 2 is a cross-sectional from elevational view of the drive shaft assembly of FIG. 1, taken through line 2-2.

DETAILED DESCRIPTION OF THE PREFERRED EMBODIMENT

Figure 1:
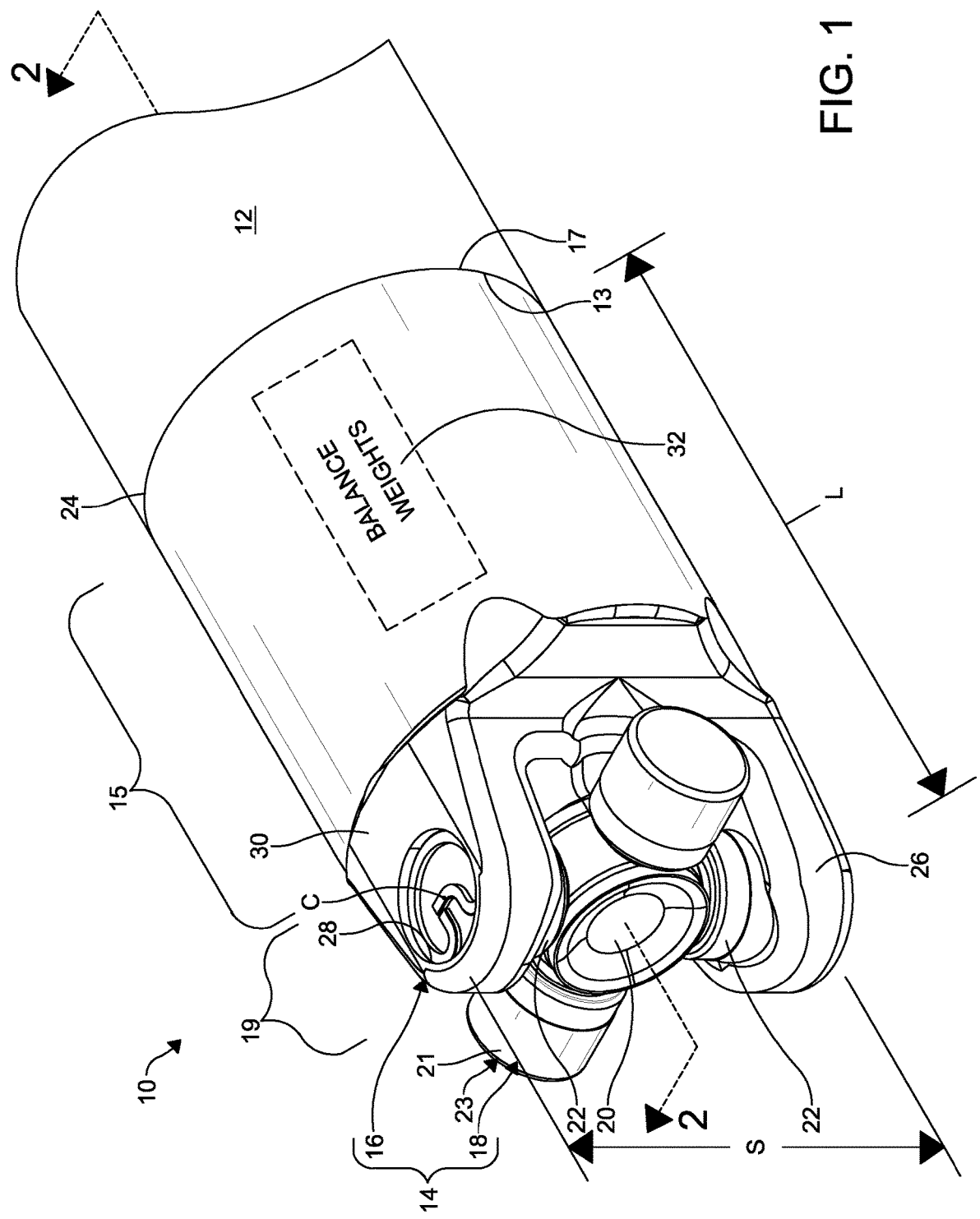
FIG. 1 is a fragmentary top perspective view of a drive shaft assembly according to an embodiment of the present disclosure.

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical. As used herein, the term "substantially" means "mostly, but not perfectly" or "approximately" as a person skilled in the art would recognize in view of the specification and drawings.

In FIG. 1, a drive shaft assembly 10 is illustrated. The drive shaft assembly 10 is configured to facilitate a transmission of rotational forces and torque between components of a vehicle. The drive shaft assembly 10 includes a shaft tube 12 and a joint assembly 14. In the embodiment illustrated, the joint assembly 14 is configured as a universal or cardan joint assembly. An example of a universal joint assembly is disclosed in U.S. Pat. No. 5,716,277, the entire disclosure of which is hereby incorporated herein by reference.

The joint assembly 14 includes a tube yoke end fitting 16 and a universal joint cross 18. The joint cross 18 has a body 20 with a plurality of cylindrically-shaped cross journals or trunnions 22 extending radially outwardly from the body 20. The trunnions 22 are integrally formed with the body 20. Although, in other embodiments, the trunnions 22 can be separately formed from the body 20 and coupled to the body 20 by coupling means. Bearing assemblies 23 are rotatably disposed at distal ends of the trunnions 22. Each of the bearing assemblies 23 are comprised of a cup 21 coaxially disposed about one of the trunnions 22. A plurality of bearings such as needle bearings, for example, are disposed annularly about each of the trunnions 22 and within each of the cups 21 intermediate the trunnions 22 and the cups 21. The bearings allow the bearing cups 21 to rotate about the trunnions 22. The joint cross 18 couples the end fitting 16 to another end fitting (not shown), yoke, or component of the vehicle.

A first portion 15 of the end fitting 16 is substantially cylindrical and includes an end seating surface 17 abutted to an end seating surface 13 of the shaft tube 12. An outer diameter of the shaft tube 12 is substantially equal to an outer diameter of the first portion 15 of the end fitting 16. The end fitting 16 is joined to the shaft tube 12 at an interface 24 in a manner wherein the first portion 15 of the end fitting 16 and the shaft tube 12 do not axially overlap each other with respect to the axial direction of the drive shaft assembly 10. A weld is applied to the interface 24 to secure the end fitting 16 to the shaft tube 12. The weld is formed by a friction welding process. As used herein, a friction welding process is a process where the end seating surface 17 of the end fitting 16 and the end seating surface 13 of the shaft tube 12 are abutted together is axial alignment. One of the end fitting 16 and the shaft tube 12 are rotated with respect to the other at a high speed. For example, the end fitting 16 is rotated with respect to the shaft tube 12, wherein the shaft tube 12 does not rotate. However, it is understood the end fitting 16 can remain rotationally stationary and the shaft tube 12 can rotate at the high speed. As the end fitting 16 is rotating against the shaft tube 12, an axial force is applied to one or both of the shaft tube 12 and the end fitting 16 to cause the end fitting 16 and the shaft tube 12 to be forced axially towards each other. As a result, a heat buildup from friction at the interface 24 of the end fitting 16 and the shaft tube 12 ultimately produces a weld. However, it is understood the shaft tube 12 and the end fitting 16 can be joined by any other type of weld or welding process as desired. For example, other types of welds may include metal inert gas (MIG) welds, stir welds, magnetically impelled arc butt (MIAB) welds, laser welds, projection or resistance welds, or any other type of weld now know or later developed.

A second portion 19 of the end fitting 16 includes a pair of ears or lugs 26 extending axially outwardly from an end of the first portion 15 of the end fitting 16 opposite the end seating surface 17 of the end fitting 16. The ears 26 are spaced from each other at diametrically opposed portions of the end fitting 16. Each of the ears 26 has an aperture 28 formed therein for receiving one of the bearing assemblies 23 of the joint cross 18. The apertures 28 are axially aligned with each other.

An ear span S of the end fitting 16 is defined as a distance between outer surfaces 30 of the ears 26. A yoke length L is defined as a distance from a center C of the apertures 28 of the ears 26 to the interface 24. The yoke length L is a length greater than 96 millimeters and is a length configured to receive and locate balance weights 32 (as indicated by the rectangle). For example, where the ear span S is 136.7 millimeters, the yoke length L is 200 millimeters. However, it is understood, other yoke lengths L can be contemplated such as between 150.37 millimeters and 200 millimeters and greater than 200 millimeters, for example, to achieve a ratio (L/S) of the yoke length L to ear span S equal to or greater than 1.1. It is understood, the yoke length L is dependent on the ear span S when trying to achieve the ratio (L/S) of the yoke length L to ear span S equal to or greater than 1.1. To minimize fatigue of the end fitting 16 and the shaft tube 12, it is optimal to have a ratio (L/S) of the yoke length L to the ear span S to be greater than or equal to 1.1. The yoke length L is a length prior to joining the end fitting 16 to the shaft tube 12 by the welding process. During the welding process, material of the end fitting 16 proximate the interface 24 may become displaced resulting in a minimal difference in the yoke length L from the yoke length L prior to the welding process. For example, the yoke length L may be decreased by approximately 1 to 4 millimeters.

The shaft tube 12 and the end fitting 16 can be formed by any process and material as desired. Advantageously, the shaft tube 12 can be formed from aluminum and the end fitting 16 can be formed from impact formed aluminum. The impact forming process can be adapted to form the longer first portion 15 to increase the yoke length L compared to known end fittings to a desired dimension. With the impact forming process, longer lengths of the first portion 15 can be accommodated and accomplished. However, it is understood the shaft tube 12 and the end fitting 16 can be formed by any material or process as desired.

To assemble, the dimensions of the end fitting 16 are determined. The ear span S of the end fitting 16 is chosen to be a dimension configured to receive the bearing assemblies 23 disposed at the distal end of the trunnions 22 of the joint cross 18. Once the ear span S is chosen, the yoke length L is chosen, wherein the ratio (L/S) of the yoke length L to the ear span S is equal to or less than 1.1. To assemble, the end fitting 16 is coupled to the shaft tube 12 by the weld through the welding process. The joint cross 18 is coupled to the ears 26 of the end fitting 16. The end fitting 16 is coupled to another end fitting which is ultimately coupled to another component of the vehicle.

Advantageously, the undesired effects of tensile stresses induced by bending of the ears 26 during operation of the drive shaft assembly 10 can be mitigated by having the ratio (L/S) of the yoke length L of the end fitting 16 to the ear span S of the end fitting 16 greater than or equal to 1.1. As a result of the longer yoke length L, tensile stresses along the yoke length L of the end fitting 16 are minimized or dissipated before reaching the interface 24 that joins the shaft tube 12 and the end fitting 16.

Another advantage of the drive shaft assembly 10 of the disclosure is the end fitting 16 has a longer yoke length L compared to known end fittings 16. As a result, the balance weights 32 can be coupled to the first portion 15 of the end fitting 16 instead of the shaft tube 12. Attachment of the balance weights 32 to the end fitting 16 is advantageous over attaching the balance weights 32 to the shaft tube 12 because the end fitting 16 generally has a thicker cross section or wall thickness in comparison to the shaft tube 12. The thicker cross section or wall thickness reduces the overall stresses, forces, and strains in and around the welds coupling the balance weight 32 to the end fitting 16 compared to a thinner cross section, thereby reducing the potential for eventual fatigue cracking in or around the balance weights 32.

Attachment of the balance weights 32 to the end fittings 16 is not commonly employed in prior art drive shaft assemblies because an amount of an imbalance that can be corrected with the weights is generally limited due to the relatively short length of the cylindrical first portion of the end fittings of prior art drive shaft assemblies. As such, attachment of the balance weights to the shaft tube is the most widely used method.

It is common practice for prior art drive shaft assemblies to increase a wall thickness of the shaft tube to reduce stresses formed by the welds. The wall thickness is typically increased at or adjacent the welds. The drive shaft assembly 10 of the present disclosure minimizes undesired stresses without increasing the wall thickness, the mass, and the cost of the shaft tube 12.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A drive shaft assembly comprising:
   a cylindrical shaft tube having an end seating surface formed at an end thereof;
   a tube yoke end fitting coupled to the shaft tube at an interface and including a cylindrical first portion having a substantially uniform outer diameter and a second portion formed by a pair of ears, a first end of the first portion having an end seating surface abutting the end seating surface of the shaft tube at the interface, wherein the first portion of the tube yoke end fitting and the shaft tube do not overlap each other with respect to an axial direction of the drive shaft assembly, a second end of the first portion having the pair of ears extending outwardly therefrom, the tube yoke end fitting having an outer diameter substantially equal to an outer diameter of the shaft tube, each of the pair of ears having an aperture formed therethrough, wherein a ratio of a yoke length of the tube yoke end fitting measured from a center of the apertures to the interface to an ear span of the tube yoke end fitting measured between outer surfaces of the pair of ears is at least 0.7; and
   a balance weight coupled to the first portion of the tube yoke end fitting.

2. The drive shaft assembly of claim 1, wherein a ratio of the yoke length to the ear span is at least 0.8.

3. The drive shaft assembly of claim 1, wherein the tube yoke end fitting is coupled to the shaft tube at the interface with a friction weld or a magnetically impelled arc butt weld.

4. The drive shaft assembly of claim 1, further comprising a universal cross joint coupled to the pair of ears.

5. The drive shaft assembly of claim 1, wherein the shaft tube and the tube yoke end fitting are formed from aluminum.

6. The drive shaft assembly of claim 1, wherein the balance weight is coupled to the first portion by a weld.

7. The drive shaft assembly of claim 1, wherein a wall thickness of the first portion of the tube yoke end fitting is greater than a wall thickness of the shaft tube.

8. The drive shaft assembly of claim 1, wherein the end seating surface of the first portion of the tube yoke end fitting and the end seating surface of the shaft tube are each annular in shape and face each other with respect to an axial direction of the drive shaft assembly.

9. The drive shaft assembly of claim 1, wherein the balance weight is coupled directly to an outer surface of the first portion of the tube yoke end fitting having the substantially uniform outer diameter.

10. The drive shaft assembly of claim 1, wherein the tube yoke end fitting is coupled to the shaft tube at the interface with a friction weld.

11. The drive shaft assembly of claim 1, wherein the tube yoke end fitting is coupled to the shaft tube at the interface with a magnetically impelled arc butt weld.

* * * * *